United States Patent [19]

Chevallier

[11] Patent Number: 5,387,014
[45] Date of Patent: Feb. 7, 1995

[54] CLAMPING PLATE FOR A MOTOR VEHICLE AIR CONDITIONING INSTALLATION

[75] Inventor: Christophe Chevallier, Le Mans, France

[73] Assignee: Valeo Thermique Habitacle, Le Mesnil Sant Denis, France

[21] Appl. No.: 135,229

[22] Filed: Oct. 12, 1993

[30] Foreign Application Priority Data

Oct. 12, 1992 [FR] France ................... 92 12160

[51] Int. Cl.⁶ .................. F16L 41/12; F16L 39/00
[52] U.S. Cl. .................. 285/26; 285/137.1; 285/206; 285/189
[58] Field of Search ........... 285/137.1, 26, 29, 189, 285/205, 206

[56] References Cited

U.S. PATENT DOCUMENTS

| | | | |
|---|---|---|---|
| 1,989,649 | 1/1935 | Bucknam | 285/137.1 X |
| 2,305,992 | 12/1942 | Guillen | 285/137.1 |
| 3,869,153 | 3/1975 | De Vincent et al. | |
| 3,944,264 | 3/1976 | Mong et al. | |
| 4,163,372 | 8/1979 | Frye et al. | |
| 4,468,054 | 8/1984 | Orth | 285/189 X |
| 4,753,268 | 6/1988 | Palau | 285/137.1 X |
| 4,758,028 | 7/1988 | Davies et al. | 285/189 |
| 4,915,419 | 4/1990 | Smith, III | 285/137.1 X |
| 5,146,766 | 9/1992 | Martins | |

FOREIGN PATENT DOCUMENTS

| | | | |
|---|---|---|---|
| 2668242 | 4/1992 | France . | |
| 304149 | 3/1918 | Germany | 285/137.1 |
| 3011226 | 10/1981 | Germany . | |
| 69225 | of 0000 | Switzerland | 285/137.1 |
| 179221 | 12/1935 | Switzerland | 285/137.1 |
| 322749 | 8/1957 | Switzerland | 285/137.1 |
| 2068490 | 8/1981 | United Kingdom . | |

Primary Examiner—Randolph A. Reese
Assistant Examiner—Heather Chun Shackelford
Attorney, Agent, or Firm—Morgan & Finnegan

[57] ABSTRACT

A motor vehicle air conditioning installation includes a pair of parallel tubes with annular beads at their free ends, for assembly to a component of the fluid circuit of the installation, and a clamping plate or strut connecting the two tubes together. The strut is an elongated plate having two through apertures. One of these is a notch open at one end of the plate. Each aperture has a substantially semicircular region matching the circumference of the associated tubular element fitting within it. The second aperture is surrounded by the material of the plate over its whole periphery, and includes a widened region through which the associated bead of the corresponding tubular element can pass, this widened region being joined directly to the substantially semicircular region. The strut cannot be separated from the tubes without resilient deformation of the latter, which avoids the danger of its becoming lost during disassembly.

7 Claims, 1 Drawing Sheet

CLAMPING PLATE FOR A MOTOR VEHICLE AIR CONDITIONING INSTALLATION

FIELD OF THE INVENTION

This invention relates in general terms to a clamping plate (referred to herein as a strut), for the simultaneous attachment, to a component of a fluid circuit (especially in a motor vehicle air conditioning installation), of the free ends of two tubular elements which extend substantially parallel to each other from the said free ends thereof. The tubular elements are joined together at their other end, and the said strut is adapted to bear on annular beads which are provided on the said free ends of the tubular elements. Sealing gaskets are compressed between the said beads and an abutment surface of the said component, under the action of tightening means urging the strut towards the said component.

In particular, the invention is concerned with a strut for the above purpose which is in the form of an elongated plate having two through apertures, namely a first aperture, in the form of a notch open in one of its ends, and a second aperture. Each of these apertures being arranged to receive a respective one of the two said tube elements. Each of these apertures comprising a substantially semicircular region which matches the circumference of the associated tube element, the said notch defining, between the end of the strut and the said semicircular region of the second aperture, a notch with parallel sides which are substantially tangential to the latter said semicircular region.

BACKGROUND OF THE INVENTION

A clamping plate or strut of the above type is described in the specification of French published patent application FR 2 668 242A. This known type of strut is intended for joining, to a component of an air conditioning installation, the free ends of the inlet and outlet tubes of an evaporator, which are joined together at their other ends by the evaporator itself, and which are arranged one above the other. In the strut described in that specification, the two apertures are in the form of slots, each of which is open in a respective one of the opposed ends of the strut. In order to prevent the strut from becoming separated from the tubes when it is disassembled from the condenser (in which case it might fall out of reach), the sides of the notches defined by the slots are inclined with respect to the plane which contains the axis of the semicircular base portions of the apertures.

DISCUSSION OF THE INVENTION

An object of the invention is to obtain the same result in a more certain manner, regardless of the relative disposition of the two tubes.

According to the invention, in a strut of the kind set forth under "Field of the Invention" above, the said second aperture is surrounded by the material of the strut over its whole periphery, and further includes a widened region which is adapted to enable the bead of the corresponding tube element to pass through it, the said widened region being joined directly to the said substantially semicircular region of the second aperture.

According to a preferred feature of the invention, the convexity of the said semicircular region of the second aperture is directed towards the said notch.

Preferably, the said widened region of the second aperture has a profile in the form of an arc of a circle greater than a semicircle.

According to another preferred feature of the invention, at least one of the faces of the strut, for engagement on the said beads, has in its zones adjacent to the said semicircular regions of the two apertures, a curvature which is convex in the longitudinal direction of the strut.

According to a further preferred feature of the invention, at least one of the faces of the strut, for engagement on the said beads, has in its zones adjacent to the said semicircular regions of the two apertures, a curvature which is convex in the transverse direction of the strut.

Where the said convex curvature extends in both the longitudinal and transverse directions, the said zones comprise spherical surface portions. Preferably in that case, the centres of the spheres of which the said surface portions form part are situated substantially on the axes of the semicircular regions of the two apertures.

Further features and advantages of the invention will appear more clearly on a reading of the detailed description of a preferred embodiment of the invention which follows, and which is given by way of example only and with reference to the accompanying drawings.

DESCRIPTION OF A PREFERRED EMBODIMENT OF THE INVENTION

Figure 1:
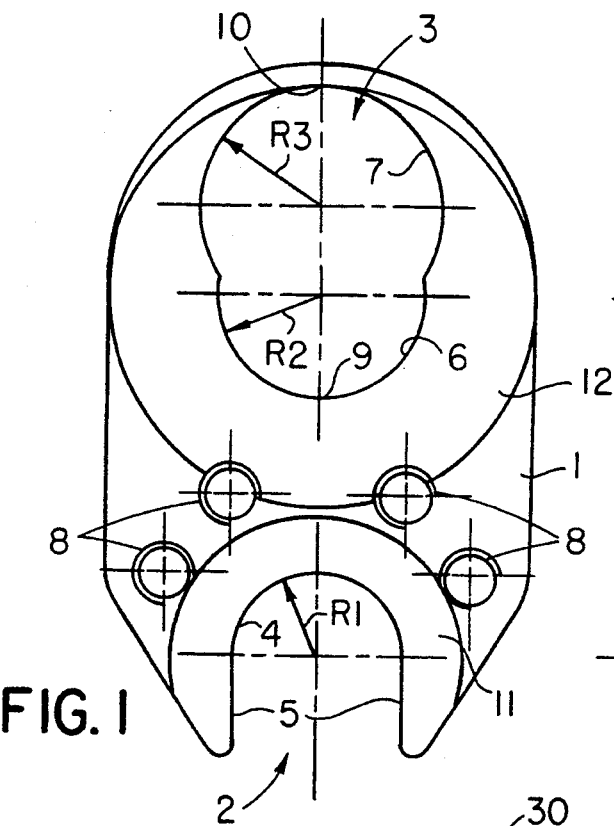
FIG. 1 is a front view of a strut in accordance with the invention.
Figure 2:
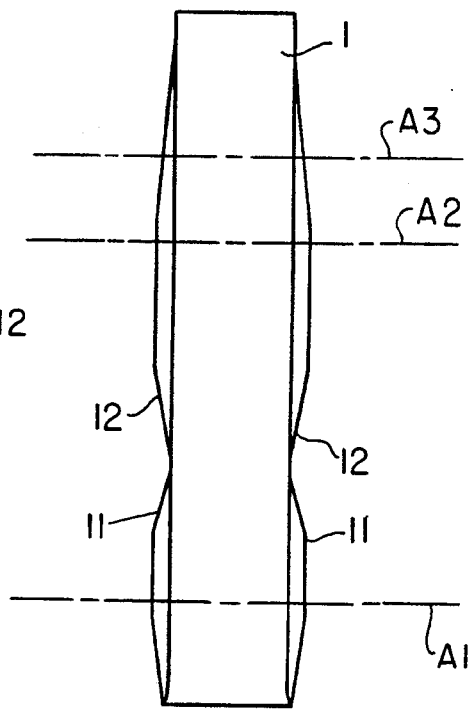
FIG. 2 is a side view of the same strut.

The strut clamping plate, in the form of a strut, as shown in the drawings, is in the form of a plate 1, the length of which is greater than its width. Two apertures 2 and 3 are formed through this plate. The first aperture 2 is in the form of a slot having a semicircular base 4 joined to two parallel sides 5 of a notch, which is open in one of the ends of the plate 1. The second aperture 3 has a closed profile consisting of two arcs of a circle, namely an arc 6 which is slightly larger than a semicircle, and an arc 7 which is substantially larger than a semicircle. The radius R3 of the arc 7 is greater than the radius R2 of the arc 6. The axes A1, A2 and A3 of the arcs 4, 6 and 7 respectively are perpendicular to the general plane of the plate 1, and are aligned with each other in that order in a longitudinal plane of symmetry of the latter.

The strut 1 is arranged to cooperate with two tubular elements 21 and 22, which are engaged respectively in the apertures 2 and 3, and which normally extend along the axes A1 and A2, the radii of the tubular elements 21 and 22 being slightly smaller than the radius R1 of the arc 4 and the radius R2 of the arc 6, respectively. The tubular elements, defining a common axial plane which is coincident with that of the arcs 4 and 6, are formed at their free ends with beads 23 and 24. The first bead 23 has a radius greater than the radius R1, while the second bead 24 has a radius greater than the radius R2 but smaller than the radius R3. Fastening screws (not shown) cooperate with threaded holes 8 in the plate 1. The holes 8 have axes which are again perpendicular to the general plane of the plate 1. When these screws are tightened, the plate 1 is forced towards the component 25, so that that one of the faces of the plate 1 which faces towards the beads is applied against the latter in such a way as to compress sealing gaskets 30 between the beads and the appropriate surface of the element 25 to which the tubular elements 21 and 22 are to be fixed.

When the strut is disconnected from the component 25, the only movement it can execute with respect to the tubular elements 21 and 22 is a pivoting movement about an axis which extends in the direction of the width of the strut. This movement is limited by the two longitudinal ends 9 and 10 of the profile of the aperture 3 coming into engagement, respectively, with two opposed generatrices of the corresponding tubular element 22, and does not permit the strut to become detached from the tubular elements. If it is desired to separate it from the tubular elements, or in order to fit it on the latter, it is necessary to deflect resiliently one or other of the free ends of the two tubular elements 21, 22 in such a way that the axis 29 of the tubular element 22 becomes substantially coincident with the axis A3, so that by an appropriate movement of the strut 1, the bead 24 is them able to pass through the portion of the aperture 3 which is defined by the arc 7.

On both sides of the plate 1, the zones 11 lying adjacent to the semicircular base region 4 of the notch 2, and the zones 12 adjacent to the semicircular base region 6 of the aperture 3, are spherical surface portions. The centres of the spheres of which the zones 11 form a part are situated on the axis A1, while the centres of the spheres of which the zones 12 form a part are situated on the axis A2. These spherical surface portions extend along the sides 5 of the notch up to the end of the plate 1 in which the notch is open, and around the arcuate region 7 of the aperture 3.

Figure 3:
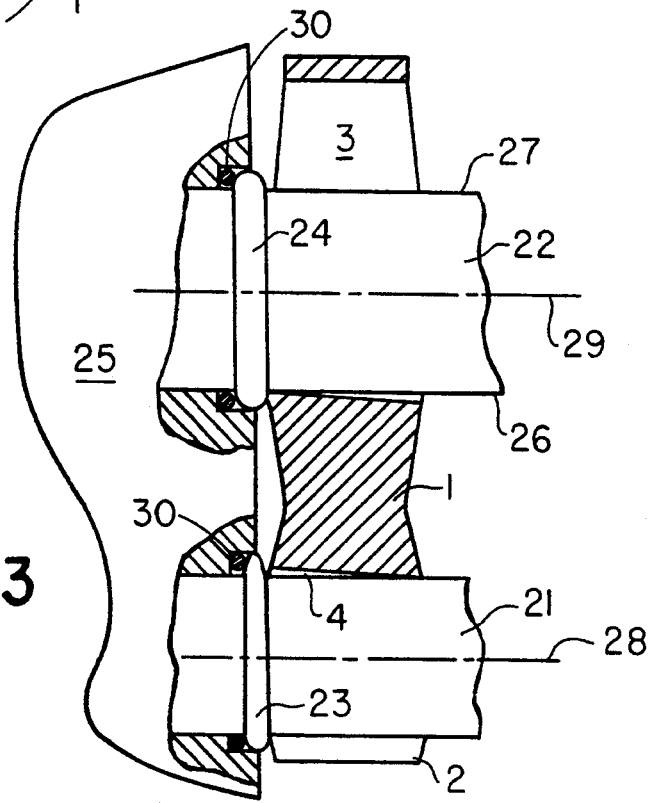
FIG. 3 is a side view of an assembly incorporating the same strut, with the latter being shown in cross section.

The strut is symmetrical firstly with respect to a plane containing the axes A1, A2 and A3, and secondly with respect to a plane at right angles to these axes. It can be mounted equally well in either one of two positions in which its two faces respectively come into contact with the beads of the tubular elements. The spherical shape of the zones 11 and 12 gives them a double convexity in the longitudinal direction and in the lateral direction of the strut. This sets the position of their points of contact with the beads, in such a way that a thrust is exerted on the latter. This thrust is centered substantially on the axes 28 and 29 of the tubular elements 21, 22 when these latter are not exactly oriented exactly on the axes A1 and A2. The convexity in the longitudinal direction plays a part when this misalignment due to the fact that the two beads are not in exactly the same plane: this situation is illustrated in FIG. 3. The convexity in the lateral direction plays its part when the axes of the two tubular elements are not perfectly coplanar.

What is claimed is:

1. A fluid circuit assembly comprising:
two substantially parallel tubular elements having a first end and a free second end; means joining the tubular elements together at said first end, said second end of each tube defining an annular bead; a circuit component receiving said free tube ends; sealing gasket means interposed between said beads and said circuit component; and means for urging said beads towards the said circuit component so as to compress said gasket means, the assembly further including a clamping plate in the form of a strut, for the simultaneous attachment of said tube elements to said circuit component, the strut being adapted to engage on said beads and comprising an elongated plate defining a first through aperture and a second through aperture, said first aperture comprising a notch open in one end of said plate, each said aperture being adapted to receive a respective one of said tubular elements, the plate having a first and a second substantially semicircular region partly defining said first and said second aperture respectively, with a profile matching the circumference of the corresponding said tubular element, said notch defining between the corresponding end of the plate and said first semicircular region a slot having parallel sides substantially tangential to the first semicircular region, wherein the material of the plate surrounds said second aperture over the whole periphery of the second aperture, defining a widened region of the second aperture whereby said bead of the corresponding tubular element can pass through said widened region, the widened region being joined directly to said second substantially semicircular region.

2. An assembly according to claim 1, wherein said second semicircular region is convex towards said notch.

3. An assembly according to claim 1, wherein said widened region has a profile defining an arc of a circle greater than a semicircle.

4. An assembly according to claim 1, wherein at least that face of the strut adapted for engagement on said beads defines a curvature which is convex in the longitudinal direction of the strut in zones which lie adjacent to said semicircular regions of the two apertures.

5. An assembly according to claim 1, wherein at least that face of the strut adapted for engagement on said beads defines a curvature which is convex in the transverse direction of the strut in zones which lie adjacent to said semicircular regions of the two apertures.

6. An assembly according to claim 4, wherein at least that face of the strut adapted for engagement on said beads defines a curvature which is convex in the transverse direction of the strut in zones which lie adjacent to said semicircular regions of the two apertures, said semicircular regions comprising spherical surface portions.

7. An assembly according to claim 6, wherein the centres of the spheres defining said surface portions lie substantially on the axes of said semicircular region of the two apertures.

* * * * *